Patented Apr. 8, 1930

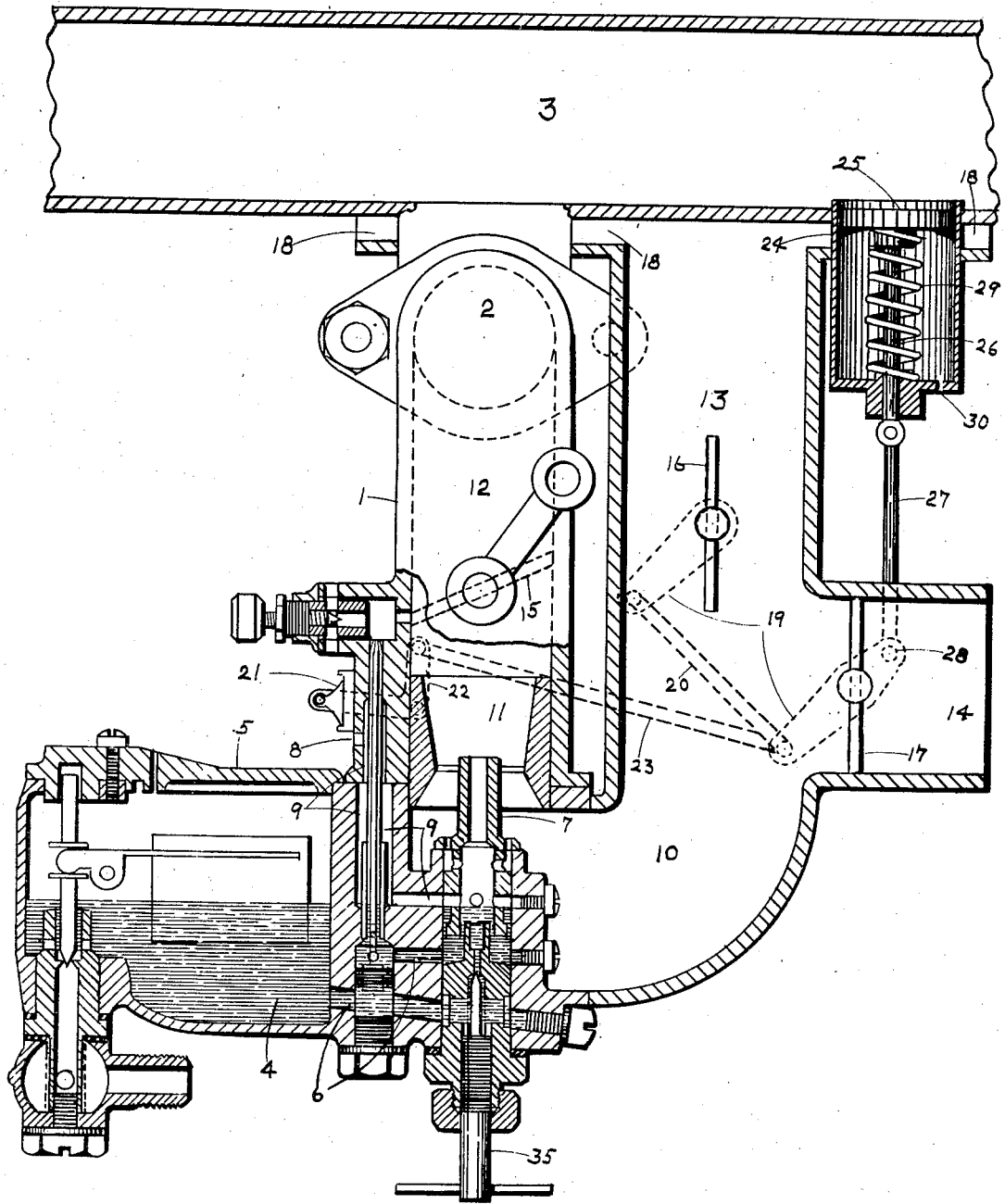
April 8, 1930.   W. T. HUNT   1,753,788
AUTOMATIC CARBURETOR CONTROL
Filed June 22, 1925
Fig. I
INVENTOR.
WARREN T. HUNT
BY
ATTORNEY.

1,753,788

UNITED STATES PATENT OFFICE

WARREN T. HUNT, OF TOLEDO, OHIO, ASSIGNOR TO THE WILLYS-OVERLAND COMPANY, OF TOLEDO, OHIO, A CORPORATION OF OHIO

AUTOMATIC CARBURETOR CONTROL

Application filed June 22, 1925. Serial No. 38,624.

This invention relates to carburetors for internal combustion engines and more particularly to methods and apparatus for controlling the heat of the mixture and the proportions of its constituent parts.

One of the objects of this invention is to provide a carburetor that will supply an efficient fuel and air mixture under varying temperature conditions.

Another object of the invention is to provide a carburetor mixture control that is automatic in its action.

Another object is to provide automatic regulation of the heat of the charge.

Another object is to provide a carburetor mixture control that will automatically compensate for variations in mixture temperatures.

A further object of the invention is to provide a carburetor that will have automatic heat regulation in proportion to the requirements therefor and also an automatic mixture compensating device that will vary the mixture in proportion to the heat regulation and maintain an efficiently burning mixture under all conditions.

Other objects of the invention will appear from the description to follow in which Figure I is a view partly in section of a carburetor and an exhaust passage for an internal combustion engine illustrating one embodiment of the invention.

Referring to the drawings in which like characters are applied to like parts throughout both views, 1 is a carburetor for delivering a combustible mixture of fuel and air to the engine (not shown) by means of inlet passage 2. After the mixture has been burned in the engine, the products of combustion or burned gases are conducted through exhaust passage 3 to the open air. Fuel 4 is conducted under the influence of engine suction from float chamber 5 through fuel ducts 6 to jet 7 wherein the fuel is mixed with a small amount of air that enters aperture 8 passes through ducts 9 into jet 7. The main air supply of the carburetor enters by means of passage 10 sweeps by jet 7 in entering choke tube 11 and dilutes the relatively rich mixture formed in jet 7, proceeds from the choke tube 11 into mixing chamber 12, inlet passage 2 and into the engine (not shown) throttle valve 15 being adjusted to control the amount of mixture. Carburetor air passage 10 communicates with hot air pipe 13 and cold air pipe 14 which are supplied with control valves 16, and 17 respectively. Hot air pipe 13 receives its air from passage 18 which surrounds exhaust passage 3 and forces the air to sweep along the heated walls thereof. Cold air pipe 14 is open to the atmosphere and the air entering it is not subjected to the influence of any heated parts. Control valves 16 and 17 are interconnected by levers 19 and link 20 so that as valve 16 is opened valve 17 is closed and valve 16 is closed when valve 17 is opened.

It is not important that valve 16 completely close as pipe 14 offers less resistance to the air than hot air pipe 13 and connecting passage 18 and in some cases valve 16 may be omitted without materially affecting the results, but I prefer to use the valve 16 in order to restrict the amount of hot air when valve 17 is open.

In addition to the interconnection of valves 16 and 17 a slide 21 is connected to one of the levers 19 by means of bell crank 22 and line 23. It may seem that valves 16 and 17 and slide 21 are operatively interconnected and a movement of one member will operate the other two. As shown in Fig. I cold air control valve 17 is closed and hot air valve 16 is open causing heated air to be delivered to carburetor 1. Hot air because of its expansion has less weight per unit of volume than cold air. Consequently in the hot air position shown in Fig. I, slide 21 is in the topmost position and a small amount of air is admitted to the jet 7 through aperture 8 and ducts 9, the air admitted to the jet 7 mixing with the gasoline spray and diluting the same, thus compensating for the decrease in weight of the heated air. The richness of the mixture may be controlled in other ways, as for instance by connections from the levers 19 for automatically adjusting the needle valve 35. The mixture control here illustrated has been selected merely because it is a convenient and easy method of applying this part of the invention to an existing type of carburetor.

If cold air is desired, valve 17 is opened, valve 16 being substantially closed by levers 19 and link 20, and slide 21 is moved to the low position closing aperture 8 and cutting off the air supply to jet 7 supplied through aperture 8, thus enriching the mixture.

The fuel, commonly used in internal combustion engines, vaporizes more or less incompletely at the lower engine temperatures and it is customary to supply heat to the mixture in order to secure better vaporizaion, but at the higher engine temperatures heat is undesirable and causes loss of power. Valves are usually supplied for regulating the heat but their operation requires thoughtful attention as well as some technical knowledge of internal combustion engines in order to correctly adjust them and the fuel mixture ratio is seldom changed to compensate for the increase or decrease of heat supplied.

It is desirable to automatically control the heat and necessary fuel changes resulting therefrom and to accomplish this I have provided cylinder 24 communicating with exhaust passage 3. Within cylinder 24 is piston 25 connected by rod 26 and link 27 to lever 19 at 28. Piston 25 is urged upwardly by spring 29, which tends to close valve 17 and maintain valve 16 and slide 21 as shown in Fig. I.

During operation of the engine the burned gases directed by exhaust passage 3 are under some pressure, induced by the resistance, of the passage 3 to the flow of the gases. The pressure rises with the power output of the engine because of the increased volume of gas delivered to the exhaust passage 3 and as the temperature of the engine increases with the power output, the necessity for heating the mixture decreases. It may now be seen that an increase of burned gas pressure in passage 3 will force piston 25 downwardly, opening 30 being provided in cylinder 24 to relieve the pressure beneath piston 25. Downward movement of piston 25 opens valve 17, substantially closes valve 16 and causes slide 21 to cover the aperture 8. Cylinder 24 is preferably arranged with its opening into the exhaust passage 3 substantially flush with the wall of the manifold in order to permit an unobstructed flow of exhaust gases. Piston 24 in this preferred arrangement of the cylinder location will be operated by the pressure head only and will be unaffected by the velocity head of the gases and should not project into the exhaust passages in any of its operative positions. Spring 29 should be so designed as to allow valve 17 to be completely opened at the maximum power output of the engine which ordinarily produces a pressure of from two to three pounds per square inch within exhaust passage 3. In combination with the parts shown and described such a spring will enable valves 16 and 17 to deliver heat to the mixture in accordance with the requirements therefor, and slide 21 to regulate the mixture in proportion to the heat delivered, so that the engine will at all times operate efficiently.

While I have shown and described somewhat in detail one embodiment of the invention, it is to be understood that this showing and description are illustrative only and that I do not regard the invention as limited to the details of construction illustrated or described herein except in so far as I have included such limitations within the terms of the following claims, in which it is my intention to claim all novelty inherent in my invention broadly as well as specifically.

I claim as my invention:

1. In an internal combustion engine, the combination of a carburetor therefor, air and fuel ducts within said carburetor, a jet communicating with both ducts wherein fuel and air are mixed, a valve for controlling the inlet to the air duct, hot and cold air pipes for said carburetor, a control valve within one of said pipes, an exhaust passage for the burned gases and means whereby the pressure head of the burned gases controls the air duct valve and the control valve within said air pipe.

2. In an internal combustion engine, the combination of a carburetor therefor, air and fuel ducts within said carburetor, a jet wherein fuel and air are delivered by said ducts, said air duct having an inlet opening and a slide valve therefor, hot and cold air pipes for said carburetor, control valves within said pipes, an exhaust passage for the burned gases and means whereby the pressure head of the burned gases controls the valves within said pipes and the air duct inlet valve whereby the amount of air delivered to the jet by said duct is varied in accordance with the position of the valves within the hot and cold air pipes.

3. In an internal combustion engine the combination of a carburetor therefor, air and fuel ducts within said carburetor, a jet wherein air and fuel are delivered by said ducts, said air duct having an inlet and a slide valve therefor, a hot air supply pipe for said carburetor, a control valve within said pipe, an exhaust passage for the burned gases and means actuated by the pressure head of the burned gases interconnecting said control valve and said slide valve whereby the air delivered to the jet by said duct is increased as the control valve is opened.

In testimony whereof, I affix my signature.

WARREN T. HUNT.